(12) United States Patent  
Kamping et al.

(10) Patent No.: US 7,525,475 B2
(45) Date of Patent: Apr. 28, 2009

(54) DRIVING ASSISTANCE METHOD FOR A VEHICLE

(75) Inventors: Ruppert Kamping, Hannover (DE); Hartmut Kitterer, Hannover (DE); Frank Zielke, Barsinghausen (DE)

(73) Assignee: Wabco GmbH, Hannover (DE)

( * ) Notice: Subject to any disclaimer, the term of this patent is extended or adjusted under 35 U.S.C. 154(b) by 45 days.

(21) Appl. No.: 11/637,304

(22) Filed: Dec. 12, 2006

(65) Prior Publication Data

US 2007/0139255 A1    Jun. 21, 2007

(30) Foreign Application Priority Data

Dec. 20, 2005    (DE) ................ 10 2005 060 820

(51) Int. Cl.
*B60K 31/00* (2006.01)
*G01S 13/88* (2006.01)
*G01S 13/00* (2006.01)

(52) U.S. Cl. ............... 342/71; 342/70; 342/175; 342/195; 701/70

(58) Field of Classification Search .......... 342/70–72, 342/175, 195; 180/167–169, 204; 701/1, 701/22–28, 36, 41–44, 70–98, 300, 301, 701/37–40, 45–49
See application file for complete search history.

(56) References Cited

U.S. PATENT DOCUMENTS

| | | | |
|---|---|---|---|
| 4,951,208 A | 8/1990 | Etoh | |
| 5,369,591 A * | 11/1994 | Broxmeyer | 180/167 |
| 6,832,157 B2 * | 12/2004 | Egami | 701/96 |
| 7,044,248 B2 | 5/2006 | Schmitt et al. | |
| 2003/0014174 A1 | 1/2003 | Giers | |
| 2003/0060936 A1 * | 3/2003 | Yamamura et al. | 701/1 |
| 2004/0061596 A1 * | 4/2004 | Egami | 701/1 |
| 2004/0225424 A1 * | 11/2004 | Yamamura et al. | 701/36 |
| 2004/0249550 A1 * | 12/2004 | Yamamura | 701/96 |
| 2005/0060082 A1 * | 3/2005 | Heuer et al. | 701/70 |
| 2005/0187713 A1 * | 8/2005 | Yamamura et al. | 701/301 |
| 2007/0265760 A1 | 11/2007 | Konhauser et al. | |

FOREIGN PATENT DOCUMENTS

| | | |
|---|---|---|
| DE | 39 13 058 A1 | 10/1990 |
| DE | 38 36 471 C2 | 8/1991 |
| DE | 102 28 348 A1 | 1/2004 |
| DE | 103 60 129 A1 | 7/2005 |
| EP | 1 257 432 B1 | 5/2005 |

* cited by examiner

*Primary Examiner*—Bernarr E Gregory
(74) *Attorney, Agent, or Firm*—Kramer Levin Naftalis & Frankel LLP

(57) ABSTRACT

A driving assistance method is provided for a vehicle in which the speed of the vehicle is controlled by means of a longitudinal guidance control system and the lateral guidance of the vehicle is controlled by means of a lateral guidance control system, and wherein lateral guidance control, which includes yaw-rate control and/or lateral acceleration limitation, has priority over speed control. To reduce the danger of an unstable handling condition of the vehicle, and to assist the vehicle operator in driving the vehicle, the longitudinal guidance control system is activated during lateral guidance control and, after lateral guidance control has ended, the longitudinal guidance control system is turned off or is shifted to an operating condition that accelerates the vehicle with longitudinal acceleration below a predetermined index longitudinal acceleration.

10 Claims, 2 Drawing Sheets

DRIVING ASSISTANCE METHOD FOR A VEHICLE

BACKGROUND OF THE INVENTION

The present invention relates generally to an improved driving assistance method for a vehicle, especially a commercial vehicle, wherein the speed of the vehicle is controlled by means of a longitudinal guidance control system and the lateral guidance of the vehicle is controlled by means of a lateral guidance control system—lateral guidance control having priority over speed control.

A method of the general type under consideration is described in DE 102 28 348 A1 as a method for controlling vehicle speed in conjunction with traction control. According to DE 102 28 348 A1, speed control is deactivated during intervention of the vehicle traction control system in the drive power of the vehicle. Speed control is automatically reactivated after the intervention of the traction control system has ended. Furthermore, an index value for vehicle speed is reduced after the intervention of the traction control system.

SUMMARY OF THE INVENTION

Generally speaking, it is an object of the present invention to provide a vehicle driving assistance method that improves over conventional methods and that decreases the danger of unstable vehicle handling conditions.

More particularly, the present invention, described in greater detail hereinafter, provides an improved driving assistance method for a vehicle equipped with a longitudinal guidance control system capable of controlling the speed of the vehicle and a lateral guidance control system capable of controlling the lateral guidance of the vehicle, lateral guidance control having priority over speed control. According to a preferred embodiment of the inventive method, the longitudinal guidance control system is activated during lateral guidance control, and, when lateral guidance control has ended, the longitudinal guidance control system is either deactivated or placed in an operating state that effects acceleration of the vehicle at a rate below a predetermined index longitudinal acceleration.

In another embodiment of the method according to the present invention, vehicle speed is reduced during lateral guidance control utilizing the longitudinal guidance control system.

In a further embodiment of the inventive method, the actual longitudinal acceleration of the vehicle is determined when lateral guidance control has ended, and, during a predetermined time interval after lateral guidance control has ended, the vehicle is accelerated utilizing the longitudinal guidance control system at a longitudinal acceleration of at most 0 m/s$^2$.

In yet another embodiment of the method according to the present invention, the actual longitudinal acceleration of the vehicle is determined when lateral guidance control has ended, and, during a predetermined time interval after lateral guidance control has ended, the vehicle is accelerated utilizing the longitudinal guidance control system at a steadily increasing acceleration rate starting from the actual longitudinal acceleration.

In a still further embodiment of the inventive method, the actual speed of the vehicle is determined when lateral guidance control has ended, and, during a predetermined time interval after lateral guidance control has ended, the vehicle is accelerated utilizing the longitudinal guidance control system to a speed at most corresponding to the determined actual speed.

In yet another embodiment of the inventive method, both the actual speed and the actual longitudinal acceleration of the vehicle are determined when lateral guidance control has ended, and any increase of the longitudinal acceleration of the vehicle per unit time is limited to a predetermined rate of increase until the speed of the vehicle is greater than the determined actual speed by a predetermined differential speed.

Desirably, the system for controlling vehicle speed includes vehicle distance control capability and/or adaptive cruise control (ACC) capability. Also, the lateral guidance control system desirably includes the capability to effect (i) brake control of individual vehicle wheels, (ii) vehicle engine control, (iii) anti-lock braking control, (iv) traction control, (v) yaw-rate control, and/or (vi) lateral acceleration limitation.

Still other objects and advantages of the invention will in part be obvious and will in part be apparent from the specification.

The present invention accordingly comprises the various steps and the relation of one or more of such steps with respect to each of the others, and embodies features of construction, combinations of elements, and arrangement of parts which are adapted to effect such steps, all as exemplified in the following detailed disclosure, and the scope of the invention will be indicated in the claims.

BRIEF DESCRIPTION OF THE DRAWINGS

For a fuller understanding of the invention, reference is had to the following description taken in conjunction with the accompanying drawings in which.

DETAILED DESCRIPTION OF THE PREFERRED EMBODIMENTS

Figure 1:
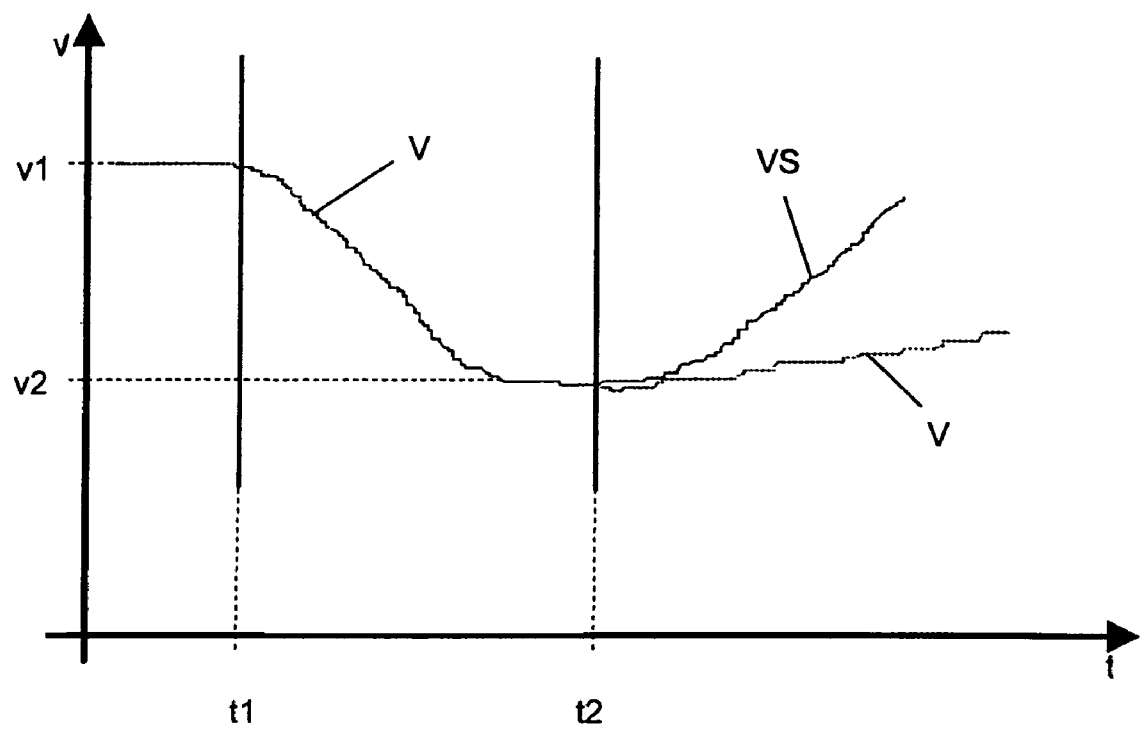
FIGS. 1 and 2 graphically represent the relationship of speed versus time for a portion of a journey of a vehicle operating in accordance with embodiments of the method of the present invention.

While the present invention is particularly suited to commercial vehicle applications, or, in other words, heavy trucks and buses, it should be appreciated that the present invention has applicability with respect to motor vehicles in general, including, for example, personal automobiles.

The present invention provides embodiments of a method, which can be implemented by program expansion of appropriate vehicle control systems, by which a vehicle longitudinal guidance control system is activated during lateral guidance control and, when lateral guidance control has ended, the longitudinal guidance control system is either turned off or placed in an operating condition that accelerates the vehicle with longitudinal acceleration below a predetermined index. That is, the longitudinal guidance control system will not be deactivated during activation of the lateral guidance control system, or in other words during a control intervention of the lateral guidance control system into the driving of the vehicle.

Lateral guidance control, which generally is also known as electronic stability control (ESC) (or as "Fahrdynamikregelung (FDR)"—literally, "handling dynamics regulation"), can signify yaw-rate control and also lateral acceleration limitation.

The present invention advantageously offers the capability of intervention of the longitudinal guidance control system into the driving of the vehicle even when the lateral guidance control system is active when a handling condition critical to longitudinal guidance develops, as would be the case, for example, if an obstruction presents itself in front of the vehicle. Moreover, when the longitudinal guidance control system is activated, which is a monitoring condition during intervention of the lateral guidance control system, it can monitor and record the handling condition and vehicle surroundings, thus permitting the actual, instantaneous handling situation to be used as the basis for subsequent control of vehicle speed once intervention of the lateral guidance control system has ended. If the longitudinal guidance control system has already been active for a certain period of time before intervention of the lateral guidance control system, it can remain active, preferably in a monitoring state, even during intervention of the lateral guidance control system.

After lateral guidance control, which can mean considerable braking of the vehicle on the whole, an abrupt, large acceleration of the vehicle can be prevented. Either the longitudinal guidance control system is completely turned off, in which case reactivation of the longitudinal guidance control system preferably requires that the vehicle operator turn it on, or the longitudinal guidance control system is shifted to an operating condition in which it accelerates the vehicle—not with a predetermined index longitudinal acceleration, which preferably is adjustable and/or is stored in the longitudinal guidance control system, and which can even correspond, for example, to the maximum longitudinal acceleration of the vehicle, but with a smaller longitudinal acceleration. This can be accomplished, for example, according to time-based and/or logical criteria, so that the vehicle is accelerated not at all or only reasonably slowly and/or drive power of the vehicle is increased and/or braking power is reduced.

In this way, the present invention can prevent situations where a vehicle that has overcome an at least potentially unstable handling condition (which led to intervention of the lateral guidance control system) reverts, after lateral guidance control has ended, to an undesired handling condition, which could again necessitate activation of the lateral guidance control system, thus resulting in undesired periodic oscillation of the vehicle about a limit to an unstable handling condition. Besides preventing this issue, the present invention also avoids startling the vehicle operator, which could possibly lead to undesired operator reactions, such as initiating heavy braking of the vehicle in response to unexpected, sudden high acceleration.

Thus, the present invention not only advantageously unburdens the operator while driving the vehicle, but in addition it increases safety. The invention advantageously counteracts a basic tendency of the longitudinal guidance control system to increase the speed of the vehicle once again soon after lateral guidance control (which usually effects a reduction of the speed). Because lateral guidance control, which preferably imposes outward yaw stabilization of the vehicle—and correspondingly jackknifing protection—has priority in principle over speed control, unstable handling conditions are stopped on a priority basis or are already precluded. The present invention prevents interventions of the longitudinal guidance control system, especially a longitudinal guidance operator assistance system, that could cause considerable and/or abrupt acceleration or reduction of deceleration after an intervention of the lateral guidance control system, especially a lateral guidance operator assistance system, that has caused deceleration or reduction of acceleration.

The longitudinal guidance control system can be an exclusively speed control unit, such as a "Tempomat." For comprehensive operator assistance, however, it is particularly advantageous when the speed control system includes distance control of the vehicle. For this purpose, the longitudinal guidance control system can be provided, for example, with a distance and speed control unit by means of which the speed, for example, can be reduced if an obstruction appears in front of the vehicle.

Preferably, the speed control system includes adaptive cruise control, while further increasing handling comfort and handling safety. In this way, the vehicle can follow another vehicle traveling in front at a safe distance.

For prevention of unstable handling conditions, it is particularly advantageous when the lateral guidance control system includes the capability to effect brake control of individual vehicle wheels and/or vehicle engine control. While further increasing handling safety, the lateral guidance control system desirably includes anti-lock braking control and/or traction control and/or yaw-rate control and/or lateral acceleration limitation. For this purpose the lateral guidance control system can be provided with, for example, an anti-lock system and a traction control unit, which prevents drive wheel slip during startup and improves the traction by intervention in engine and/or brake management.

It is also advantageous to reduce vehicle speed by means of the longitudinal guidance control system during lateral guidance control. In this way, vehicle braking can be initiated automatically, while additionally increasing safety, for example in the case where an obstruction appears in front of the vehicle or where the distance to a vehicle traveling ahead becomes unacceptably short.

Preferably, after lateral guidance control has ended, the actual longitudinal acceleration of the vehicle is determined and, during a predetermined time interval after lateral guidance control has ended, the vehicle is accelerated by means of the longitudinal guidance control system at a longitudinal acceleration of at most 0 m/s$^2$, so that, in a manner relevant to safety—for example if the longitudinal guidance control system has recognized an obstruction in front of the vehicle during lateral guidance control—the vehicle can be decelerated promptly after lateral guidance control has ended, but not accelerated.

In order to avoid an abrupt transition from the intervention of the lateral guidance control system to a considerable increase in vehicle speed that could jeopardize handling stability and/or overstress the vehicle operator, it is advantageous to determine the actual longitudinal acceleration of the vehicle after lateral guidance control has ended and, during a predetermined time interval after lateral guidance control has ended, accelerate the vehicle by means of the longitudinal guidance control system at a steadily increasing acceleration, starting from the actual longitudinal acceleration.

Alternatively, after lateral guidance control has ended, the actual speed of the vehicle can be determined and, during a predetermined time interval after the end of lateral guidance control, the vehicle can be accelerated by means of the longitudinal guidance control system at most to a speed corresponding to the determined actual speed. Thereby, any further deceleration of the vehicle after intervention of the lateral guidance control system has ended can be stopped by means of a positive acceleration that counteracts the deceleration, without causing the vehicle to experience an excessive speed increase resulting in an unstable handling condition.

An excessive, undesired, distinct increase in speed can also be prevented when, after lateral guidance control has ended, both the actual speed and the actual longitudinal acceleration of the vehicle are determined, and any increase in the longitudinal acceleration of the vehicle per unit time is limited to a predetermined and adjustable rate of increase of acceleration, until the speed of the vehicle is greater by a predetermined and adjustable differential speed than the determined actual speed. When this differential speed is reached, the vehicle can again be accelerated without restriction by means of the longitudinal guidance control system.

Referring now to the drawing figures, where like reference numerals are used for corresponding elements, as an example of a portion of a journey of a vehicle designed as a commercial vehicle, a curve V of the speed v of the commercial vehicle as a function of time t is plotted in the diagram shown in FIG. 1. Up to a first instant t1, the vehicle is traveling at a constant first speed v1 controlled by means of a longitudinal guidance control system. At first instant t1, an intervention of the lateral guidance control system takes place in response to an unstable handling condition that has already occurred or that is very imminent and has been recognized by the lateral guidance control system.

Between first instant t1 and a later, second instant t2, the lateral guidance of the vehicle is controlled by means of the lateral guidance control system in order to stabilize the handling condition of the vehicle. In particular, the yaw rate is controlled and, if necessary, limitation of lateral acceleration is imposed, with the result that the speed v is reduced from first speed v1 to a slower, second speed v2 at second instant t2. Immediately after lateral guidance control has ended, as takes place at second instant t2, the longitudinal guidance control system is shifted into an operating condition that accelerates the commercial vehicle with only a small longitudinal acceleration, which is lower than a predetermined and preferably variable index longitudinal acceleration stored in the longitudinal guidance control system and which is lower than the maximum acceleration.

Thereby, only a small increase in speed v takes place for the time t after second instant t2, or in other words for t>t2, and for this time interval curve VL of the speed exhibits only a gentle slope (see lower curve). In contrast, if the vehicle were accelerated at the index longitudinal acceleration rate immediately after the intervention of the lateral guidance control system, a curve VS with a much steeper slope (see upper curve) would result. In such a case, the potential danger would exist that, after the intervention of the lateral guidance control system has ended, the vehicle would again immediately enter a condition that jeopardizes handling stability.

A longitudinal guidance control system can be provided which includes speed control (cruise control (CC)) and/or ACC. A lateral guidance control system can be provided which includes ESC, and yaw-rate control and/or lateral acceleration limitation and/or ASR (traction control) and/or ABS (anti-lock braking system) control.

Figure 2:
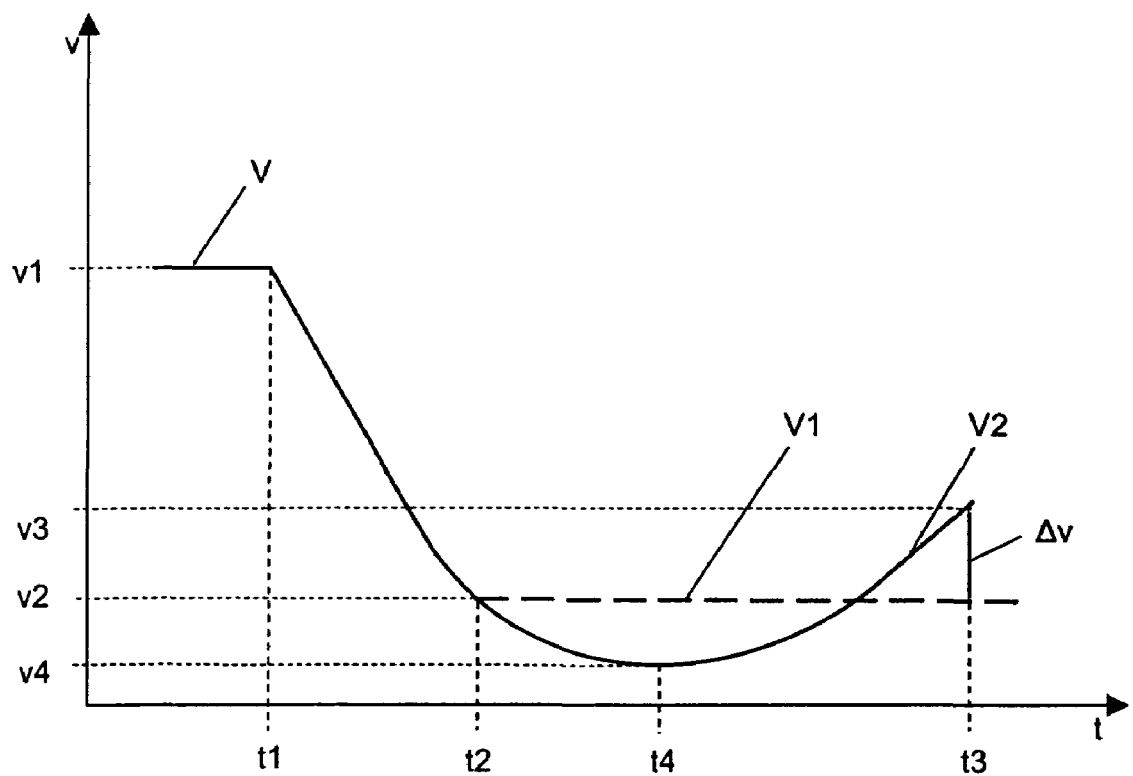

A further speed-time diagram illustrating, as an example, a portion of a journey of a vehicle is depicted in FIG. 2. In the diagram, a curve V of the speed v of the vehicle is plotted as a function of time t. Up to a first instant t1, the vehicle is traveling at a constant, first speed v1. At instant t1, a control intervention of a lateral guidance control system of the vehicle takes place, wherein the lateral guidance of the vehicle is controlled and, specifically, the yaw rate is controlled, and, if necessary, the lateral acceleration is limited, for which purpose the speed v is reduced to a second speed v2.

The intervention of the lateral guidance control system ends at a second instant t2, coinciding with second speed v2. Beginning at second instant t2, two alternative possibilities are illustrated as examples of the further speed curve.

According to a first alternative, illustrated by a dashed line, a further speed curve V1 begins from second instant t2. This curve is based on a determination of the actual speed of the vehicle, corresponding in this case to second speed v2, after lateral guidance control has ended, as takes place at second instant t2. Also, after lateral guidance control has ended, and for at least a predetermined time interval bounded by second instant t2 and a later, third instant t3, the vehicle is accelerated by means of the longitudinal guidance control system to at most a speed corresponding to the determined actual speed. In the present practical example, the speed is maintained constant at the second speed v2.

According to a second alternative, illustrated by a solid line, another speed curve V2 begins from instant t2. Corresponding to this speed curve V2, the speed v continues to decrease after second instant t2, reaching a fourth speed v4 at a later, fourth instant t4, after which it increases until third instant t3, which is later in time than fourth instant t4, as a result of positive acceleration of the vehicle. At third instant t3, the vehicle has reached a third speed v3. Speed curve V2 corresponds to an embodiment of the vehicle driving assistance method according to the present invention wherein, after lateral guidance control has ended, as takes place at second instant t2, the actual speed of the vehicle, corresponding in this case to second speed v2, and the actual longitudinal acceleration of the vehicle are determined. Any increase in the longitudinal acceleration of the vehicle per unit time is limited to a predetermined rate of acceleration until the speed of the vehicle becomes greater than the determined actual speed, which in this case is second speed v2, by a predetermined differential speed $\Delta v$, which is preferably stored in the longitudinal guidance control system and which corresponds to the difference between third speed v3 and second speed v2. After third instant t3, the speed curve can assume a much steeper slope (not shown) corresponding to a greater speed increase per unit time.

Accordingly, the present invention provides an improved vehicle driving assistance method that decreases the danger of unstable vehicle handling conditions by enabling active longitudinal guidance control during lateral guidance control, and, when lateral guidance control has ended, either deactivating longitudinal guidance control or utilizing it to effect appropriate acceleration/speed control of the vehicle.

It will thus be seen that the objects set forth above, among those made apparent from the preceding description, are efficiently attained, and since certain changes may be made in carrying out the above method and in the constructions set forth without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

What is claimed is:

1. In a vehicle equipped with a longitudinal guidance control system for controlling vehicle speed and a lateral guidance control system for controlling lateral guidance of the vehicle, lateral guidance control having priority over speed control, a driving assistance method comprising the steps of activating the longitudinal guidance control system during lateral guidance control, and when lateral guidance control has ended, at least one of (i) deactivating the longitudinal guidance control system and (ii) placing the longitudinal guidance control system in an operating condition that effects acceleration of the vehicle at a rate below a predetermined index longitudinal acceleration.

2. The method according to claim 1, wherein the longitudinal guidance control system includes means for effecting vehicle distance control.

3. The method according to claim 1, wherein the longitudinal guidance control system includes means for effecting vehicle adaptive cruise control.

4. The method according to claim 1, wherein the lateral guidance control system includes means for effecting at least one of braking control of individual vehicle wheels and vehicle engine control.

5. The method according to claim 1, wherein the lateral guidance control system includes means for effecting at least one of (i) anti-lock braking control, (ii) traction control, (iii) yaw-rate control and (iv) lateral acceleration limitation.

6. The method according to claim 1, further comprising the step of reducing the vehicle speed during lateral guidance control utilizing the longitudinal guidance control system.

7. The method according to claim 1, further comprising the steps of determining the actual longitudinal acceleration of the vehicle when lateral guidance control has ended, and, during a predetermined time interval after lateral guidance control has ended, accelerating the vehicle utilizing the longitudinal guidance control system at a longitudinal acceleration of at most 0 m/s2.

8. The method according to claim 1, further comprising the steps of determining the actual longitudinal acceleration of the vehicle when lateral guidance control has ended, and, during a predetermined time interval after lateral guidance control has ended, accelerating the vehicle utilizing the longitudinal guidance control system at a steadily increasing acceleration rate starting from the actual. longitudinal acceleration.

9. The method according to claim 1, further comprising the steps of determining the actual speed of the vehicle when lateral guidance control has ended, and, during a predetermined time interval after lateral guidance control has ended, accelerating the vehicle utilizing the longitudinal guidance control system to a speed at most corresponding to the determined actual speed.

10. The method according to claim 1, further comprising the steps of determining the actual speed and the actual longitudinal acceleration of the vehicle when lateral guidance control has ended, and limiting any increase of the longitudinal acceleration of the vehicle per unit time to a predetermined rate of increase until the speed of the vehicle is greater than the determined actual speed by a predetermined differential speed.

* * * * *